United States Patent [19]

Suffridge et al.

[11] 4,248,301
[45] Feb. 3, 1981

[54] MICELLAR CRUDE OIL DISPLACEMENT WITH PARTITIONED HYDROCARBON SULFONATES

[75] Inventors: Fred E. Suffridge, Broken Arrow, Okla.; Victor J. Kremesec, Jr., Berwyn, Ill.

[73] Assignee: Standard Oil Company (Indiana), Chicago, Ill.

[21] Appl. No.: 59

[22] Filed: Jan. 2, 1979

[51] Int. Cl.$^3$ .............................................. E21B 43/22
[52] U.S. Cl. ..................................... 166/252; 166/274
[58] Field of Search ................ 166/252, 273, 274, 275

[56] References Cited

U.S. PATENT DOCUMENTS

| | | | |
|---|---|---|---|
| 2,800,962 | 7/1957 | Garst | 166/273 |
| 3,126,952 | 3/1964 | Jones | 166/274 |
| 3,302,713 | 2/1967 | Ahearn et al. | 166/274 |
| 3,348,611 | 10/1967 | Reisberg | 166/275 |
| 3,444,930 | 5/1969 | Williams et al. | 166/273 |
| 3,480,080 | 11/1969 | Murphy | 166/252 |
| 3,956,372 | 5/1976 | Coleman, Jr. et al. | 260/505 S |
| 4,008,769 | 2/1977 | Chang | 166/274 |
| 4,079,785 | 3/1978 | Hessert et al. | 166/252 X |
| 4,146,499 | 3/1979 | Rosano | 166/274 X |

*Primary Examiner*—James A. Leppink
*Assistant Examiner*—George A. Suchfield
*Attorney, Agent, or Firm*—Fred E. Hook; Donald L. Traut

[57] ABSTRACT

Micellar crude oil displacement efficiency is improved by partitioning the hydrocarbon sulfonate surfactants used in the formulation of micellar fluids between aqueous and oleic phases of a separation liquid and using the portion which is partitioned into the oleic phase in the formulation of the micellar fluid.

8 Claims, No Drawings

MICELLAR CRUDE OIL DISPLACEMENT WITH PARTITIONED HYDROCARBON SULFONATES

SUMMARY OF THE INVENTION

In enhanced oil recovery processes, crude oil is displaced through a reservoir with saline, aqueous micellar fluids produced by mixing a hydrocarbon sulfonate surfactant in an amount greater than the critical micelle concentration with a saline, aqueous fluid. These aqueous micellar fluids are capable of dissolving crude oil and water associated with the crude oil, as well as water that is commonly used for displacing micellar fluids through formations.

Hydrocarbon sulfonate surfactants used in the formulation of micellar fluids have water and oil soluble components, both of which contribute to the ability of the micellar fluid to displace crude oil through a subterranean reservoir. It has now been found that the removal of a portion of the water soluble component from the hydrocarbon sulfonate by partitioning the oil soluble components and the water soluble components of the hydrocarbon sulfonates into dissimilar solvents can improve micellar displacement efficiency. The water soluble portion can be removed by partitioning the sulfonate between an aqueous solvent such as aqueous alcohol and an oleic solvent such as chloroform.

DETAILED DESCRIPTION

The hydrocarbon sulfonates used in the formulation of crude oil displacing micellar fluids are commonly prepared by sulfonating hydrocarbons, such as crude oil, petroleum fractions or synthetic hydrocarbons, with sulfuric acid or sulfur trioxide. The products resulting from this sulfonation of hydrocarbons are generally neutralized with alkali metal bases or with ammonium hydroxide to produce the sulfonate. The hydrocarbon to be sulfonated is preferably selected such that the average equivalent weight of the sulfonate will be within the range of about 300 to about 700, and preferably with a range of about 400 to about 500. Equivalent weight refers to the average molecular weight of the hydrocarbon portion per sulfonate group, e.g., a hydrocarbon having an average molecular weight of about 400 and which has been sulfonated with one sulfonate group per hydrocarbon radical has an average equivalent weight of about 400. Hydrocarbon sulfonates having equivalent weights below about 400 are generally water-soluble, while hydrocarbon sulfonates with equivalent weights above about 400 are generally oil-soluble. The oil-soluble portion of the sulfonate is an important contributor to the ability of a micellar fluid to displace crude oil, while the water-soluble portion of the sulfonate is an important contributor into the ability of petroleum sulfonates to form a micellar fluid. A mixture of hydrocarbon sulfonates having equivalent weights of about 300 to about 600 have been found to provide saline micellar fluids over a range of salinity conditions that is experienced in enhanced oil recovery projects. Within the narrower equivalent weight range of 400 to 500, the range of salinity conditions under which satisfactory crude oil displacing micellar fluids can be produced is expanded.

It has now been found that the petroleum sulfonates used in the formulation of micellar fluids can be improved by partitioning water soluble and oil soluble components of hydrocarbon sulfonates into dissimilar solvents. The water soluble components separated by partitioning are sulfonates with equivalent weights of less than about 400 and inorganic salts. Micellar fluids formulated with the oil soluble components separated by partitioning have shown improved micellar crude oil displacement efficiencies.

In the separation of substantially oil and water soluble components of a hydrocarbon sulfonate surfactant by partitioning the sulfonate is homogeneously dispersed in a separation liquid which comprises an oleic solvent in which oil soluble components of the sulfonate are substantially soluble and water soluble components are substantially insoluble. The oil soluble components will be partitioned into the oleic solvent and can be recovered. The recovered sulfonate surfactant can be used by those skilled in the art for the formulation of micellar fluids containing such components as salt for interfacial tension control, cosurfactants for forming the micellar fluid, water soluble polymers for mobility control and the removed sulfonate surfactant for displacing crude oil through a subterranean reservoir. The separation liquid can contain an aqueous phase and an oleic phase, with water soluble components partitioning into the aqueous phase and oil soluble components separating into the oleic phase. The tests hereinafter shown in this application illustrate the partitioning of hydrocarbon sulfonate between aqueous alcohol as an aqueous phase and chloroform as an oleic phase. The alcohol used in formulating the aqueous alcohol phase can be any substantially water soluble alcohol such as methyl, ethyl or propyl alcohol. The aqueous alcohol illustrated in this application is formulated to contain about equal volumes of substantially water soluble alcohol and water, and separation liquid illustrated in this application contains about 50 to about 70 percent by volume of the aqueous alcohol and about 30 to about 50 percent by volume chloroform.

Micellar crude oil displacement efficiencies of micellar fluids formulated with the partitioned oil soluble components as compared to micellar solutions formulated with the petroleum sulfonate as normally produced are shown in Table I. Petroleum sulfonate used in the tests illustrated in Table I is an ammonium petroleum sulfonate.

The water and oil soluble components were separated by partitioning the petroleum sulfonate in a separatory funnel between an aqueous and oleic phase. The combined volume of the solids and the aqueous and oleic phases was about 500 ml. Petroleum sulfonate and the components listed as the partitioning medium in Table I were added to the separatory funnel, mixed well and allowed to remain quiescent for about two hours. The solids which separated into the oleic phase were formulated into a micellar fluid and used for displacing crude oil from a Berea sandstone core.

The results of these core tests are shown as micellar oil displacement in Table I. These core tests were conducted in Berea sandstone cores having diameters of about 2 inches and lengths of about one foot. The cores are prepared for testing with the micellar fluid by evacuating them followed by saturation with 1.0 Normal (N) NaCl brine. This is followed by flowing about 5.5 pore volumes of 0.25 N NaCl brine through the core, followed by about 1 pore volume of crude oil. The core is then waterflooded with about 100 ml of 0.25 N NaCl brine at a flow rate of about 60 ml of the brine per hour. Following the waterflood, the core is flooded with about 0.1 pore volume of micellar fluid at about 12 ml per hour. The micellar fluid used in the tests shown in Table I is formulated in 0.25 N NaCl brine with sufficient sulfonate to provide a micellar fluid containing 4.8 weight percent active sulfonate, 0.4 weight percent n-hexanol, 2000 ppm Xanflood XC biopolymer, and Dowcide G bactericide.

It is shown in Table I that selective partitioning of petroleum sulfonates can improve the micellar displacement of crude oil. It is shown that the oleic portion of partitioned petroleum sulfonate, partitioned between chloroform as an oleic phase, and aqueous alcohol as the aqueous phase, exhibits improved micellar displacement of crude oil when compared to the oleic phase of petroleum sulfonate partitioned between chloroform as the oleic phase and water as the aqueous phase. It is also shown that the oleic portion of the petroleum sulfonate partitioned between chloroform and aqueous alcohol exhibits improved micellar displacement of crude oil when compared to petroleum sulfonate which has not been partitioned. The micellar displacement of oil is also shown for a recombination of components partitioned between chloroform as the oleic phase and aqueous alcohol as the aqueous phase. The inorganic salt which was partitioned into the aqueous phase was not recombined in order to show the effect of inorganic salt on micellar oil displacement. It is shown in Table I that there is little difference in displacement efficiency between recombined sulfonate and the sulfonate which has not been partitioned.

The data included in Table II shows the effect of partitioning petroleum sulfonate prepared by sulfonating vacuum gas-oil. It is shown that the use of the oleic fraction from partitioning one vacuum gas-oil sulfonate improved micellar oil displacement, while the oleic fraction from the other vacuum gas-oil sulfonate did not improve micellar oil displacement.

TABLE II

| | Partitioning Medium | | Solids Partitioned | | Micellar |
|---|---|---|---|---|---|
| Sample | Aqueous Phase (Vol. %) | Oleic Phase (Vol. %) | Aqueous Phase (Wt. %) | Oleic Phase (Wt. %) | Oil Displacement (%) |
| 5 | 28% $H_2O$ 24% $C_2H_5OH$ | 48% $CHCl_3$ | 25 | 75 | 95 |
| 5 | Blank (Sulfonate not Partitioned) | | | | 94 |
| 6 | 33⅓% $H_2O$ 33⅓% $C_2H_5OH$ | 33⅓% $CHCl_3$ | 24 | 76 | 95 |
| 6 | Blank (Sulfonate not Partitioned) | | | | 81 |

Partitioning of aqueous and oil soluble components of petroleum sulfonates between brine and organic solvent is shown in Table III. The results obtained show that the salinity of the brine and the selection of organic solvent is important for obtaining a separation between aqueous and oil soluble components.

TABLE III

| Partitioning Medium | | Solids Partitioned | |
|---|---|---|---|
| Aqueous Phase | Oleic Phase | Aqueous Phase (Wt. %) | Oleic Phase (Wt. %) |
| 59 vol. % $H_2O$ | 41 vol. % $CHCl_3$ | 25 | 75 |
| 43 vol. % 1.5 N NaCl Brine | 57 vol. % $CHCl_3$ | 28 | 72 |
| 43 vol. % 1.5 N NaCl Brine | 57 vol. % $CHCl_3$ | 36 | 64 |
| 43 vol. % 1.5 N NaCl Brine | 57 vol. % $C_6H_{14}$ | 97 | 3 |
| 43 vol. % 1.5 N NaCl Brine | 57 vol. % $C_6H_{14}$ | 95 | 5 |

TABLE I

| | Partitioning Medium | | Solids Partitioned | | Micellar |
|---|---|---|---|---|---|
| Sample | Aqueous Phase (Vol. %) | Oleic Phase (Vol. %) | Aqueous Phase (Wt. %) | Oleic Phase (Wt. %) | Oil Displacement (%) |
| 1 | 25% $H_2O$ 25% $C_2H_5OH$ | 50% $CHCl_3$ | 28 | 72 | 82 |
| 2 | 33⅓% $H_2O$ 33⅓% $C_2H_5OH$ | 33⅓% $CHCl_3$ | 30 | 70 | 98 |
| 3 | 33⅓% $H_2O$ 33⅓% $C_2H_5OH$ | 33⅓% $CHCl_3$ | 29 | 71 | 91 |
| 4 | 59% $H_2O$ | 41% $CHCl_3$ | 25 | 75 | 72 |
| Blank (Sulfonate not Partitioned) | | | | | 73 |
| 2 Recombined (except for inorganic salt) | | | | | 71 |

An analysis of the components partitioned into the aqueous and oleic phases of sample in Table I indicated that lower equivalent weight sulfonates and inorganic salts were partitioned into the aqueous phase and that high equivalent weight sulfonates and unsulfonated oiil partitioned into the oleic phase. The sulfonate, prior to partitioning, had an average equivalent weight of about 363, while the portion of the sulfonate partitioned into the aqueous phase had an average equivalent weight of about 240, and the portion of the sulfonate partitioned into the oleic phase had an average equivalent weight of about 429.

While certain embodiments of the invention have been described for illustrative purposes, the invention is not limited thereto, various other modifications or embodiments of the invention will be apparent to those skilled in the art in view of this disclosure. Such modifications or embodiments are within the spirit and scope of the disclosure.

What is claimed is:

1. A method of displacing crude oil through a crude oil containing subterranean reservoir having an injection means in fluid communication through the reservoir with a production means, which comprises:

injecting a saline aqueous micellar fluid containing a hydrocarbon sulfonate surfactant in an amount greater than the critical micelle concentration into the reservoir through such an injection means, wherein an aqueous solution of said hydrocarbon sulfonate is homogenenously dispersed in a separation liquid comprising an oleic solvent in which an oil soluble portion of the sulfonate is substantially soluble and a water soluble portion is substantially insoluble and wherein the oil soluble portion of the hydrocarbon sulfonate surfactant partitioned into said solvent is the surfactant contained in the saline aqueous micellar fluid, and the saline aqueous micellar fluid is displaced through at least a portion of the reservoir for displacing crude oil toward such a production means.

2. In a method of improving the displacement of crude oil through a crude oil containing subterranean reservoir having an injection means in fluid communication through the reservoir with a production means, wherein a saline aqueous micellar fluid containing hydrocarbon sulfonate surfactant in an amount greater than the critical micelle concentration is injected into the reservoir through said injection means and is displaced through at least a portion of the reservoir for displacing crude oil toward said production means, and wherein said hydrocarbon sulfonate surfactant comprises oil and water soluble components, wherein the improvement comprises:

separating oil soluble components from substantially water soluble components of said hydrocarbon sulfonate, and formulating said micellar fluid with said oil soluble components.

3. In a method of displacing crude oil through a crude oil containing subterranean reservoir having an injection means in fluid communication through the reservoir with a production mans, wherein a saline aqueous micellar fluid containing hydrocarbon sulfonate surfactant in an amount greater than the critical micelle concentration is injected into the reservoir through said injection means and is displaced through at least a portion of the reservoir for displacing crude oil toward said production means, wherein the improvement comprises:

partitioning said surfactant into aqueous and oleic phases of a separation liquid comprising an oleic solvent in which an oil soluble portion of the sulfonate is substantially soluble and a water soluble portion is substantially insoluble, determining the crude oil displacement efficiency of said micellar fluid containing said surfactant and said micellar fluid containing a portion of said partitioned surfactant and, formulating said micellar fluid with surfactant which exhibits the highest crude oil displacement efficiency.

4. The method of claim 3 wherein said separation liquid comprises aqueous alcohol as said aqueous phase and chloroform as said oleic phase.

5. In a method of displacing crude oil through a crude oil containing subterranean reservoir having an injection means in fluid communication through the reservoir with a production means, wherein a saline aqueous micellar fluid containing hydrocarbon sulfonate surfactant in an amount greater than the critical micelle concentration is injected into the reservoir through said injection means and is displaced through at least a portion of the reservoir for displacing curde oil toward said production means, wherein the improvement comprises:

partitioning said surfactant into a separation liquid comprising aqueous alcohol and chloroform, and formulating said micellar fluid with surfactant which is partitioned into the chloroform.

6. The method of claim 4 or 5 wherein said aqueous alcohol comprises water and ethyl alcohol.

7. The method of claim 4 or 5 wherein said aqueous alcohol comprises about 50 percent by volume water and about 50 percent by volume ethyl alcohol.

8. The method of claim 4 or 5 wherein said surfactant is partitioned into a separation liquid comprising about 50 to about 70 percent by volume aqueous alcohol and about 30 to about 50 percent by volume chloroform.

* * * * *

UNITED STATES PATENT OFFICE
CERTIFICATE OF CORRECTION

PATENT NO. : 4,248,301

DATED : February 3, 1981

INVENTOR(S) : Fred E. Suffridge and Victor J. Kremesec, Jr.

It is certified that error appears in the above-identified patent and that said Letters Patent are hereby corrected as shown below:

Column 3, line 61, the last word in that line "oiil" should read---oil---

Column 4, TABLE III, the word "Brine" has been omitted from the bottom of Aqueous Phase column in said TABLE III; insert---Brine---underneath 1.5 N Na Cl, Column 5, line 40, "mans" should read ---means---;

Column 6, line 27, "curde" should read ---crude---.

Signed and Sealed this

Twenty-sixth Day of January 1982

[SEAL]

Attest:

Attesting Officer

GERALD J. MOSSINGHOFF

Commissioner of Patents and Trademarks